United States Patent
Shinohara et al.

(10) Patent No.: US 9,586,588 B2
(45) Date of Patent: Mar. 7, 2017

(54) POWER SUPPLY CONTROL APPARATUS

(71) Applicant: TOYOTA JIDOSHA KABUSHIKI KAISHA, Toyota-shi, Aichi-ken (JP)

(72) Inventors: Masanori Shinohara, Susono (JP); Kohei Tochigi, Susono (JP); Tomoharu Maeda, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/068,743

(22) Filed: Mar. 14, 2016

(65) Prior Publication Data

US 2016/0332630 A1 Nov. 17, 2016

(30) Foreign Application Priority Data

May 15, 2015 (JP) ................. 2015-100232

(51) Int. Cl.
| | |
|---|---|
| *B60W 30/188* | (2012.01) |
| *B60W 10/26* | (2006.01) |
| *B60W 40/10* | (2012.01) |
| *B60W 10/06* | (2006.01) |

(Continued)

(52) U.S. Cl.
CPC ........ *B60W 30/1886* (2013.01); *B60W 10/06* (2013.01); *B60W 10/26* (2013.01); *B60W 30/18009* (2013.01); *B60W 40/10* (2013.01); *H02J 7/007* (2013.01); *B60W 2530/00* (2013.01); *B60W 2710/244* (2013.01)

(58) Field of Classification Search
CPC ..... B60W 30/18018; B60W 30/18054; B60W 30/18127; B60W 30/188; B60W 30/1886; B60W 10/06; B60W 10/24; B60W 10/26; B60W 2710/244; B60W 40/10; B60W 40/105; B60W 2530/14; B60W 2520/10; B60W 2520/105; B60W 20/00; B60W 20/10; B60W 20/11; B60W 20/12; B60W 20/13; B60W 20/14
See application file for complete search history.

(56) References Cited

U.S. PATENT DOCUMENTS

2013/0166118 A1* 6/2013 Kim ............ B60W 10/06
  701/22
2014/0067175 A1* 3/2014 Cho ............ B60W 20/13
  701/22

(Continued)

FOREIGN PATENT DOCUMENTS

JP 2010030430 A * 2/2010
JP 2013-167219 A 8/2013

*Primary Examiner* — Thomas G Black
*Assistant Examiner* — Sara Lewandroski
(74) *Attorney, Agent, or Firm* — Sughrue Mion, PLLC

(57) ABSTRACT

A power supply control apparatus is provided with: a first calculating device configured to calculate a vehicle stop time rate on the basis of a travel history of the vehicle; a second calculating device configured to calculate a stoppable time rate on the basis of the travel history, and an estimating device configured to estimate an electric power amount associated with the idling stop control, on the basis of the calculated stoppable time rate if the idling stop control is allowed when the vehicle decelerates, and to estimate the electric power amount, on the basis of the calculated vehicle stop time rate if the idling stop control is not allowed when the vehicle decelerates.

1 Claim, 5 Drawing Sheets

(51) Int. Cl.
*B60W 30/18* (2012.01)
*H02J 7/00* (2006.01)

(56) References Cited

U.S. PATENT DOCUMENTS

| | | | |
|---|---|---|---|
| 2014/0156132 A1* | 6/2014 | Ichimoto | B60W 10/06 701/22 |
| 2014/0365099 A1* | 12/2014 | Tochigi | F02D 17/04 701/99 |
| 2016/0325726 A1* | 11/2016 | Liang | B60W 20/12 |

* cited by examiner 60 sec interval/10 min in total

POWER SUPPLY CONTROL APPARATUS

CROSS-REFERENCE TO RELATED APPLICATIONS

This application is based upon and claims the benefit of priority of the prior Japanese Patent Application No. 2015-100232, filed on May 15, 2015, the entire contents of which are incorporated herein by reference.

BACKGROUND OF THE INVENTION

1. Field of the Invention

Embodiments of the present invention relate to a power supply control apparatus configured to control a power supply system of a vehicle, and particularly relate to a power supply control apparatus of a vehicle having an idling stop function.

2. Description of the Related Art

For this type of apparatus, for example, there is proposed an apparatus configured to estimate power consumption during an idling stop of a vehicle from a vehicle stop time rate of the vehicle, configured to set an electric power amount for the idling stop on the basis of the estimated power consumption, and configured to control a state of charge (SOC) of a battery to avoid the SOC falling below the set electric power amount for the idling stop (refer to patent literature: Japanese Patent Application Laid Open No. 2013-167219).

By the way, there is known a so-called free run in which power transmission between an engine and drive wheels is blocked and a vehicle travels due to inertia when the vehicle decelerates or in similar situations. If the idling stop of the engine is performed even when the vehicle free-runs, fuel efficiency can be improved.

In the technology described in the patent literature, however, it is premised that the idling stop is performed only when the vehicle stops. Thus, if the idling stop of the engine is performed not only when the vehicle stops but also when the vehicle free-runs, a power consumption amount during the idling stop exceeds the electric power amount for the idling stop in the technology described in the patent literature, and there is thus such a technical problem that idling stop control is possibly prohibited or stopped.

SUMMARY

In view of the aforementioned problems, it is therefore an object of embodiments of the present invention to provide a power supply control apparatus that can perform the idling stop of the engine not only when the vehicle stops but also when the vehicle free-runs during deceleration.

The above object of the present invention can be achieved by a power supply control apparatus configured to perform idling stop control of an engine when a vehicle stops and in a partial period when the vehicle decelerates, wherein the vehicle includes the engine, a generator, and a battery, said power supply control apparatus provided with: a first calculating device configured to calculate a vehicle stop time rate, which is a rate of a time in which the vehicle is stopped, on the basis of a travel history of the vehicle; a second calculating device configured to calculate a stoppable time rate, which is a rate of a sum of a time in which the idling stop control is allowed when the vehicle decelerates and a time in which the vehicle is stopped, on the basis of the travel history, an estimating device configured to estimate an electric power amount associated with the idling stop control, on the basis of the calculated stoppable time rate if the idling stop control is allowed when the vehicle decelerates, and to estimate the electric power amount, on the basis of the calculated vehicle stop time rate if the idling stop control is not allowed when the vehicle decelerates; and a controlling device configured to control charge of the battery performed by power generation of the generator so as to avoid a remaining electric power amount of the battery falling below the estimated electric power amount.

According to the power supply control apparatus in embodiments of the present invention, the power supply control apparatus is configured to perform the idling stop control of the engine when the vehicle stops and in the partial period when the vehicle decelerates. The power supply control apparatus is provided with: the first calculating device, the second calculating device, the estimating device, and the controlling device.

The first calculating device, which is provided with, for example, a memory, a processor, and the like, calculates the vehicle stop time rate, which is a rate of the time in which the vehicle is stopped, on the basis of the travel history of the vehicle. Since various known aspects can be applied to a method of obtaining the travel history of the vehicle and a method of calculating the vehicle stop time rate, an explanation of details of the methods will be omitted.

The second calculating device, which is provided with, for example, a memory, a processor, and the like, calculates the stoppable time rate, which is a rate of the sum of the time in which the idling stop control is allowed when the vehicle decelerates and the time in which the vehicle is stopped, on the basis of the travel history.

The "time in which the idling stop control is allowed" means a time in which a predetermined condition that allows the idling stop control except when the vehicle stops (e.g. less than or equal to 20 km/h, during deceleration, etc.) is satisfied, regardless of whether or not the idling stop control is actually performed.

The estimating device, which is provided with, for example, a memory, a processor, and the like, estimates the electric power amount associated with the idling stop control, on the basis of the stoppable time rate calculated by the second calculating device, if the idling stop control is allowed when the vehicle decelerates. On the other hand, the estimating device estimates the electric power amount, on the basis of the vehicle stop time rate calculated by the first calculating device, if the idling stop control is not allowed when the vehicle decelerates; and The controlling device, which is provided with, for example, a memory, a processor, and the like, controls the charge of the battery performed by the power generation of the generator so as to avoid the remaining electric power amount of the battery falling below the electric power amount estimated by the estimating device. Since various known aspects can be applied to a method of controlling the charge of the battery, an explanation of details of the method will be omitted.

According to the power supply control apparatus in embodiments of the present invention, the stoppable time rate is calculated by the second calculating device. If the idling stop control is allowed when the vehicle decelerates, the estimating device estimates the electric power amount associated with the idling stop control, on the basis of the stoppable time rate, and the controlling device controls the charge of the battery so that the remaining electric power amount of the battery does not fall below the estimated electric power amount.

In other words, charge control of the battery is performed on the basis of the stoppable time rate that takes into consideration the time in which the idling stop control is allowed when the vehicle decelerates and the time in which the vehicle is stopped. Thus, not only when the vehicle stops but also in a case where the engine is stopped by the idling stop control when the vehicle free-runs during deceleration, the SOC of the battery can be appropriately maintained.

On the other hand, even if the idling stop control is not allowed when the vehicle decelerates, if the electric power amount associated with the idling stop control is estimated on the basis of the stoppable time rate, the SOC of the battery becomes excessive, and fuel efficiency possibly decreases. Thus, in the present invention, if the idling stop control is not allowed when the vehicle decelerates, the electric power amount associated with the idling stop control is estimated on the basis of the vehicle stop time rate obtained only from the time in which the vehicle is stopped. It is therefore possible to suppress the decrease in fuel efficiency.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

A power supply control apparatus according to an embodiment of the present invention will be explained with reference to FIG. 1 to FIG. 8.

(Configuration of Vehicle)

Figure 1:
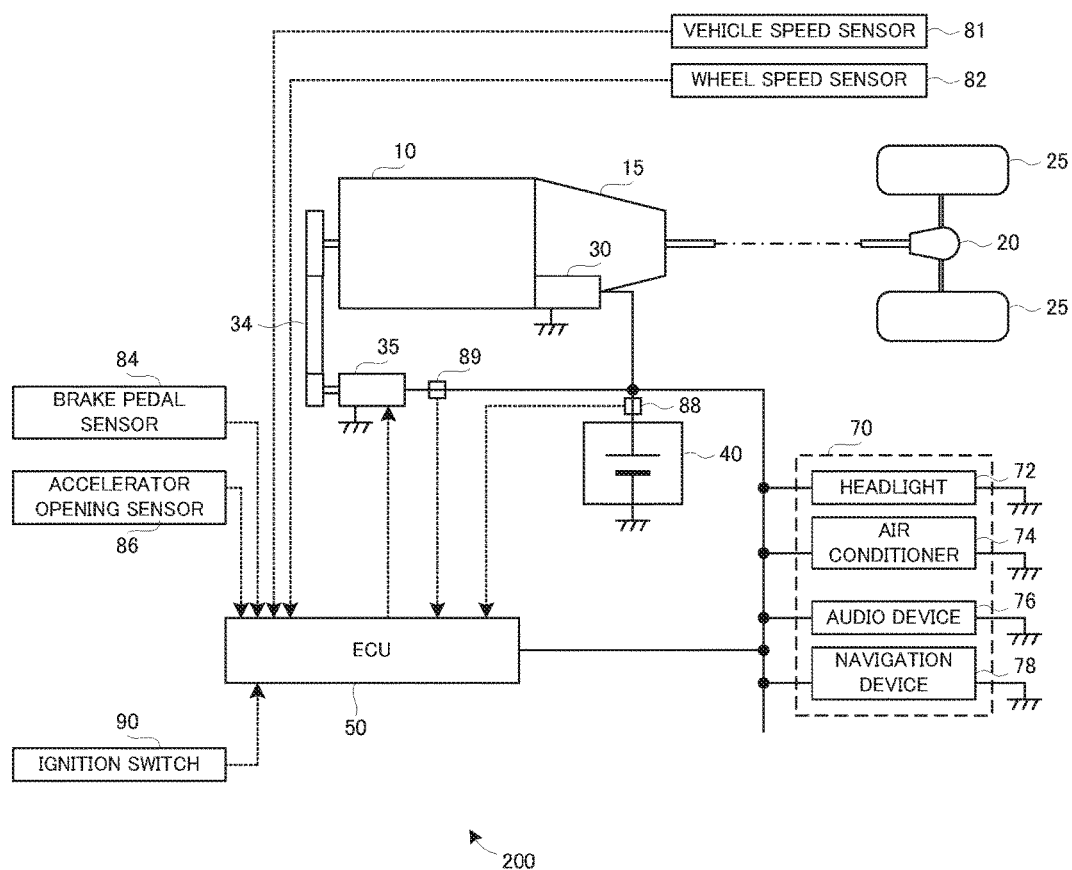
FIG. 1 is a schematic block diagram illustrating a configuration of a vehicle according to an embodiment.

Firstly, a configuration of a vehicle according to an embodiment will be explained with reference to FIG. 1. In FIG. 1, a vehicle 200 is provided with an engine 10, au automatic transmission 15, a differential gear 20, drive wheels 25, a starter 30, an alternator 35, a battery 40, and an electronic control unit (ECU) 50.

The vehicle 200 is a vehicle having an idling stop function of the engine 10. Particularly in the embodiment, the vehicle 200 is configured to stop the engine 10 by using the idling stop function not only when the vehicle stops but also in a partial period when the vehicle decelerates.

The engine 10 is an internal combustion engine configured to generate power by burning fuel, such as, for example, gasoline. The power of the engine 10 is transmitted to the automatic transmission 15, and is also transmitted to the alternator 35 via a drive mechanism 34, such as, for example, a belt drive. Output of the engine 10 is changed by an engine control computer (not illustrated) according to a stepping amount of an accelerator pedal (not illustrated) operated by a driver.

The automatic transmission 15 automatically performs a transmission gear ratio change (a so-called shift change). The power of the engine 10 (the number of revolutions/torque) is changed by the automatic transmission 15, and is transmitted to the left and right drive wheels 25 via the differential gear 20 as the desired number of revolutions/torque. In this manner, the power of the engine 10 is transmitted to the drive wheels 25 via the automatic transmission 15 while being changed according to the stepping amount of the accelerator pedal. As a result, the vehicle 10 is accelerated/decelerated.

The alternator 35 uses a part of the power of the engine 10, to perform power generation. Electric power generated by the alternator 35 is used to charge the battery 40 or to perform similar actions via an inverter (not illustrated).

The battery 40 is, for example, a lead storage battery or the like, which is a direct current power supply with a voltage of 12 volts (V), and supplies electric power to peripheral devices provided for other than a main body of the engine 10. Hereinafter, the peripheral device that is provided for other than the main body of the engine 10 and that uses stored power of the battery 40 to operate is referred to as an "auxiliary machine". A group of auxiliary machines is referred to as "auxiliary machinery".

The vehicle 100 is provided with a headlight 72, an air conditioner 74, an audio device 76, a navigation device 78, or the like, as auxiliary machinery 70.

The starter 30 is a cell motor configured to start the engine 10 by using the electric power supplied from the battery 40. Normally, if the driver operates an ignition switch 90 when starting to drive the vehicle 100 that is stopped, then, the starter 30 is started, and the engine 10 is started. The starter 30 is also used when the engine 10 is restarted from a state in which the engine 10 is stopped by the idling stop control.

The ECU 50 is configured as a computer that is provided with: a central processing unit (CPU) configured to execute a computer program; a read only memory (ROM) configured to store therein the computer program or the like; a random access memory (RAM) configured to temporarily store therein data; input/output ports connected to various sensors and actuators or the like; and so on. The ECU 50 is supplied with the electric power from the battery 40.

As the sensors connected to the ECU 50, there are a vehicle speed sensor 81 configured to detect a vehicle speed, a wheel speed sensor 82 configured to detect a rotational speed of the drive wheels 25, a brake pedal sensor 84 configured to detect stepping or not stepping a brake pedal (not illustrated), an accelerator opening sensor 86 configured to detect the stepping amount of the accelerator pedal (not illustrated) as an accelerator opening degree, a battery current sensor 88 configured to detect discharge/charge current of the battery 40 (or battery current), an alternator current sensor 89 configured to detect output current of the alternator 35 (or alternator current), and the like. As the actuators connected to the ECU 50, there are the starter 30, the alternator 35, and the like.

The ECU 50 controls the starter 30 and the alternator 35, on the basis of respective signals from the various sensors and the engine control computer (not illustrated), thereby controlling engine stop and restart (i.e. idling stop control) and also controlling a SOC of the battery 40. The SOC is defined as a value obtained by dividing an amount of electricity that remains in the battery 40 by an amount of electricity stored when the battery is fully charged.

(Configuration of ECU)

Figure 2:
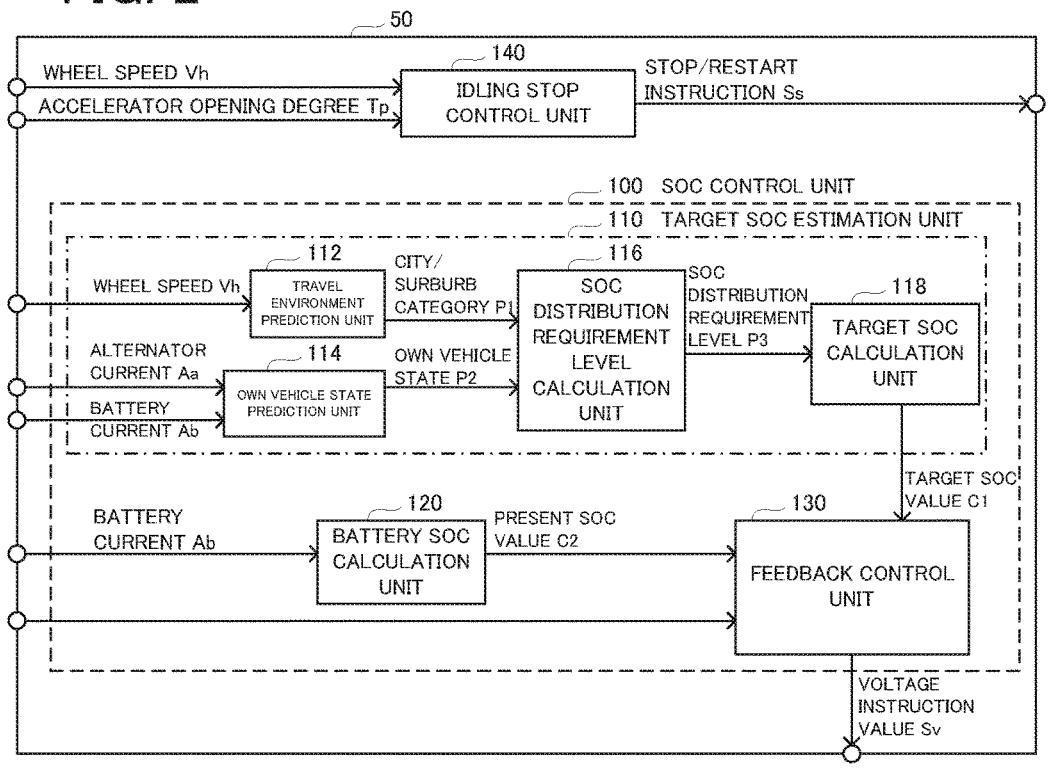
FIG. 2 is a diagram functionally illustrating a part of a configuration of an ECU according to the embodiment.

Next, a configuration of the ECU 50 will be explained with reference to FIG. 2. In FIG. 2, the ECU 50 is provided with a SOC control unit 100 and an idling stop control unit 140. The SOC control unit 100 and the idling stop control unit 140 are functions that are actually realized by the CPU provided for the ECU 50 executing the computer program stored in the ROM.

The idling stop control unit 140 obtains a wheel speed Vh detected by the wheel speed sensor 82 and an accelerator opening degree Tp detected by the accelerator opening sensor 86, and outputs an instruction Sc for stopping/restarting the engine 10 to the starter 30.

The idling stop control unit 140 stops the engine 10 during deceleration of the vehicle 200, if a predetermined deceleration engine stop condition is satisfied when the vehicle 200 decelerates. The idling stop control unit 140 stops the engine 10 when the vehicle 200 stops if the predetermined deceleration engine stop condition is not satisfied. Then, when it is detected by the accelerator opening sensor 86 that the accelerator pedal is stepped, an engine restart condition is considered to be satisfied, and the idling stop control unit 140 outputs an engine restart instruction to the starter 30.

Here, the "deceleration engine stop condition" includes, for example, that the vehicle speed is 20 km/h or less, that the vehicle is decelerating (i.e. brake on, or accelerator off), that a maximum vehicle speed after a previous engine restart is 20 km/h or more, that the number of engine revolutions is 1500 rpm or less, or similar conditions. If the automatic transmission 15 is a continuously variable transmission, then, the deceleration engine stop condition further includes that a shift of the automatic transmission 15 is a D range, that a road gradient is in a range of −10 degrees to 5 degrees, or similar conditions.

The numerical values exemplified as the deceleration engine stop condition are one example, and may be changed according to vehicle specification to which the present invention is applied.

The SOC control unit 100 is provided with a target SOC estimation unit 110, a battery SOC calculation unit 120, and a feedback control unit 130.

The target SOC estimation unit 110 estimates a SOC that is to be ensured in a period between the engine stop and the restart by the idling stop control (hereinafter referred to as a "stop and start period" as occasions demands), as a target SOC value C1, while the vehicle runs.

The battery SOC calculation unit 120 calculates a present SOC C2 of the battery 40 (hereinafter referred to as a "present SOC value") on the basis of the discharge/charge current Ab of the battery 40 (hereinafter referred to as "battery current") detected by the battery current sensor 88.

The feedback control unit 130 obtains a difference value obtained by subtracting the present SOC value C2 form the target SOC value C1 while the vehicle runs, and obtains a voltage instruction value Sv that allows the difference value to be zero by using feedback control. The voltage instruction value Sv indicates a power generation amount of the alternator 35, and is transmitted to the alternator 35.

The target SOC estimation unit 110 will be additionally explained. The target SOC estimation unit 110 is provided with a travel environment prediction unit 112, an own vehicle state prediction unit 114, a SOC distribution requirement level calculation unit 116, and a target SOC calculation unit 118.

The travel environment prediction unit 112 predicts a travel environment. Here, the "travel environment" is a parameter that indicates to what degree the vehicle will be in an idling stop state in the future (after a present time), and it can be said that it is a parameter regarding a ratio of the stop and start period in a predetermined future period. In other words, the "travel environment" is a travel environment of the vehicle that causes the engine stop by the idling stop control.

The travel environment prediction unit 112 uses, specifically, for example, a vehicle stop time rate and an average speed of the vehicle 200, an average steering angle of a steering wheel, and the like, to obtain a plurality of travel environment indexes, and obtains a weighted average of the obtained travel environment indexes, as a general travel environment index P1 (or "city/suburb category P1" in FIG. 2).

Specifically, for example, as the vehicle 200 has a lower average speed, the possibility that the vehicle is in a city is higher. The travel environment prediction unit 112 thus sets the travel environment index led from the average vehicle speed to be higher, as the average vehicle speed becomes lower. Alternatively, the average steering angle of the steering wheel increases if the steering wheel is sharply turned while the vehicle 200 travels, or if the steering wheel is turned many times. It is therefore considered that the possibility that the vehicle is in a city is higher, as the average steering angle of the steering wheel increases. The travel environment prediction unit 112 thus sets the travel environment index led from the average steering angle to be higher, as the average steering angle increases.

As the vehicle 200 has a higher vehicle stop time rate, the possibility that the vehicle is in a city is higher. The travel environment prediction unit 112 thus sets the travel environment index led from the vehicle stop time rate to be higher, as the vehicle stop time rate is higher.

A method of calculating the vehicle stop time rate according to the embodiment will be specifically explained.

The travel environment prediction unit 112 calculates a ratio of a vehicle stop time in a predetermined period, on the basis of the vehicle speed detected by the vehicle speed sensor 81, and the wheel speed detected by the wheel speed sensor 82, which are elements of a travel history of the vehicle.

In the embodiment, the travel environment prediction unit 112 has two units having different predetermined periods, which are a recent past vehicle stop time rate calculation unit (not illustrated) and a distant past vehicle stop time rate calculation unit (not illustrated).

The recent past vehicle stop time rate calculation unit calculates a ratio of a vehicle stop time of the vehicle 200 in a relatively short period, which is, for example, a past X min. The distant past vehicle stop time rate calculation unit calculates a ratio of the vehicle stop time of the vehicle 200 in a relatively long period, which is, for example, a past Y min (Y>X). In the embodiment, an explanation below will be made with X=10 and Y=15.

Figure 3A:
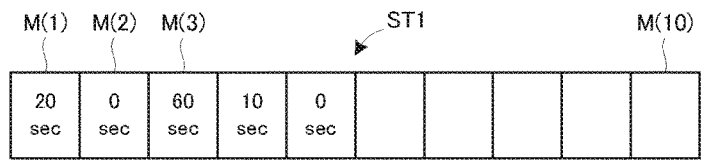
FIG. 3A and FIG. 3B are conceptual diagrams illustrating a concept of calculating a recent past vehicle stop time rate according to the embodiment.
Figure 3B:
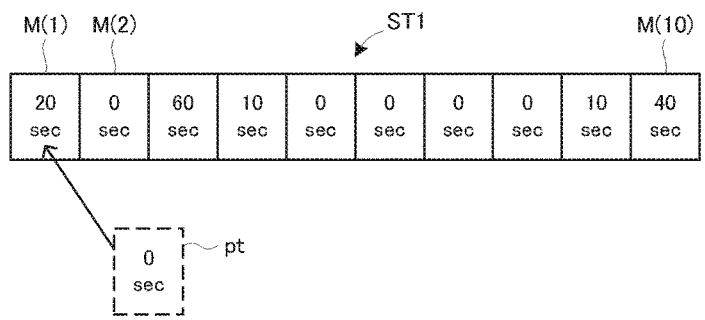

The method of calculating the vehicle stop time rate according to the embodiment will be explained with reference to FIG. 3A and FIG. 3B. FIG. 3A and FIG. 3B are conceptual diagrams illustrating a concept of calculating the recent past vehicle stop time rate according to the embodiment.

The recent past vehicle stop time rate calculation unit starts a vehicle stop time obtaining routine for obtaining the vehicle stop time, with a time point at which the vehicle speed of the vehicle 200 exceeds a predetermined speed (e.g. 15 km/h) as a starting point, after the engine 10 is started in response to an operation of the ignition switch 90 by the driver.

Specifically, the recent past vehicle stop time rate calculation unit has a storage stack ST1, as illustrated in FIG. 3A and FIG. 3B. The storage stack ST1 is provided with 10 stack elements M(1) to M(10). The recent past vehicle stop time rate calculation unit obtains, at intervals of 60 seconds, the vehicle stop time for the 60 seconds, and sequentially stores the obtained result in one of the stack elements M(1) to M(10). The stack element to store the result therein sequentially changes from M(1) to M(10).

The vehicle stop time is obtained by determining whether or not the vehicle is stopped on the basis of the wheel speed detected by the wheel speed sensor 82 and by measuring the stop time for 60 seconds. In other words, the recent past vehicle stop time rate calculation unit substantially obtains the vehicle stop time for 60 seconds at intervals of 60 seconds, and sequentially stores the obtained vehicle stop time one by one from the stack elements M(1) to M(10).

More specifically, as illustrated in FIG. 3A, the recent past vehicle stop time rate calculation unit stores a vehicle stop time of 20 seconds in the stack element M(1) at a lapse of 60 seconds, stores a vehicle stop time of 0 seconds in the stack element M(2) at a lapse of 120 seconds, and stores a vehicle stop time of 60 seconds in the stack element M(3) at a lapse of 180 seconds.

As illustrated in FIG. 3B, if the vehicle stop time is stored until the last stack element M(10), i.e. if 10 min (or 600 seconds) in total elapses, a vehicle stop time pt obtained in a next period is stored in the first stack element M(1). At this time, the stack elements M(2) to M(10) hold the values that were stored until then. A vehicle stop time (not illustrated) obtained in a next period of the vehicle stop time pt is stored in the second stack element M(2). In this manner, if the vehicle stop time is stored in all the stack elements M(1) to M(10), the recent past vehicle stop time rate calculation unit sequentially updates the vehicle stop time from the stack element M(1), which is the head of the storage stack ST1.

The recent past vehicle stop time rate calculation unit performs a vehicle stop time rate calculation routine, in addition to the aforementioned vehicle stop time obtaining routine. In the vehicle stop time rate calculation routine, the recent past vehicle stop time rate calculation unit obtains a sum of the vehicle stop times stored in the respective stack elements M(1) to M(10) of the storage stack ST1, and divides the obtained sum by the time required to fill or occupy all the stack elements M(1) to M(10) (i.e. 600 seconds), thereby obtaining a recent past vehicle stop time rate R1. The recent past vehicle stop time rate R1 is recalculated every time the stack element M is updated, i.e. at intervals of 60 seconds.

The distant past vehicle stop time rate calculation unit also performs the vehicle stop time obtaining routine and the vehicle stop time rate calculation routine, as in the recent past vehicle stop time rate calculation unit, and calculates a recent past vehicle stop time rate R2. The distant past vehicle stop time rate calculation unit, however, sequentially updates each of stack elements N(1) to N(10) of a storage stack ST2 (not illustrated) at intervals of 90 seconds. In other words, the distant past vehicle stop time rate calculation unit stores the vehicle stop time of the vehicle 200 for 90 seconds, in each of the stack elements N(1) to N(10).

The distant past vehicle stop time rate calculation unit obtains a sum of the vehicle stop times stored in the respective stack elements N(1) to N(10) of the storage stack ST2, and divides the obtained sum by the time required to fill or occupy all the stack elements N(1) to N(10) (i.e. 900 seconds), thereby obtaining a distant past vehicle stop time rate R2. The distant past vehicle stop time rate R2 is recalculated every time the stack element N is updated, i.e. at intervals of 90 seconds.

The calculation of the vehicle stop time rate described above is continuously performed until the engine 10 is stopped in response to an off operation of the ignition switch by the driver.

The travel environment prediction unit 112 adopts a greater value out of the recent past vehicle stop time rate R1 and the distance past vehicle stop time rate R2, which are respectively calculated by the recent past vehicle stop time rate calculation unit and the distant past vehicle stop time rate calculation unit, as the vehicle stop time rate.

The vehicle stop time rate is not limited to the value obtained by the aforementioned calculation method, but may be, for example, a rate of a total time in which the wheel speed Vh is zero with respect to a predetermined period.

By the way, as described above, the engine 10 can be stopped by the idling stop control, not only when the vehicle 200 stops but also in a partial period when the vehicle 200 decelerates. The travel environment prediction unit 112 thus calculates, as a stoppable time rate, a rate of a sum of the vehicle stop time of the vehicle 200 and a time in which the aforementioned deceleration engine stop condition is satisfied when the vehicle 200 decelerates, with respect to a predetermined period.

Specifically, the travel environment prediction unit 112 has two units having different predetermined periods, which are a recent past stoppable time rate calculation unit (not illustrated) and a distant past stoppable time rate calculation unit (not illustrated).

Each of the recent past stoppable time rate calculation unit and the distant past stoppable time rate calculation unit performs the same routines as those of the vehicle stop time obtaining routine and the vehicle stop time rate calculation routine. However, each of the recent past stoppable time rate calculation unit and the distant past stoppable time rate calculation unit obtains, as a stoppable time, a sum of the time in which the vehicle 200 is stopped and the time in which the deceleration engine stop condition is satisfied.

The recent past stoppable time rate calculation unit divides the obtained stoppable time, for example, by 600 seconds, thereby calculating a recent past stoppable time rate. On the other hand, the distant past stoppable time rate calculation unit divides the obtained stoppable time, for example, by 900 seconds, thereby calculating a distant past stoppable time rate.

The travel environment prediction unit 112 adopts a greater value out of the recent past stoppable time rate and the distance past stoppable time rate, which are respectively calculated by the recent past stoppable time rate calculation unit and the distant past stoppable time rate calculation unit, as the stoppable time rate.

If the idling stop control is allowed when the vehicle 200 decelerates, the travel environment prediction unit 112 uses the stoppable time rate, instead of the vehicle stop time rate, and obtains the travel environment index. The travel environment prediction unit 112 sets the travel environment index led from the stoppable time rate to be higher, as the stoppable time rate becomes higher.

Figure 4:
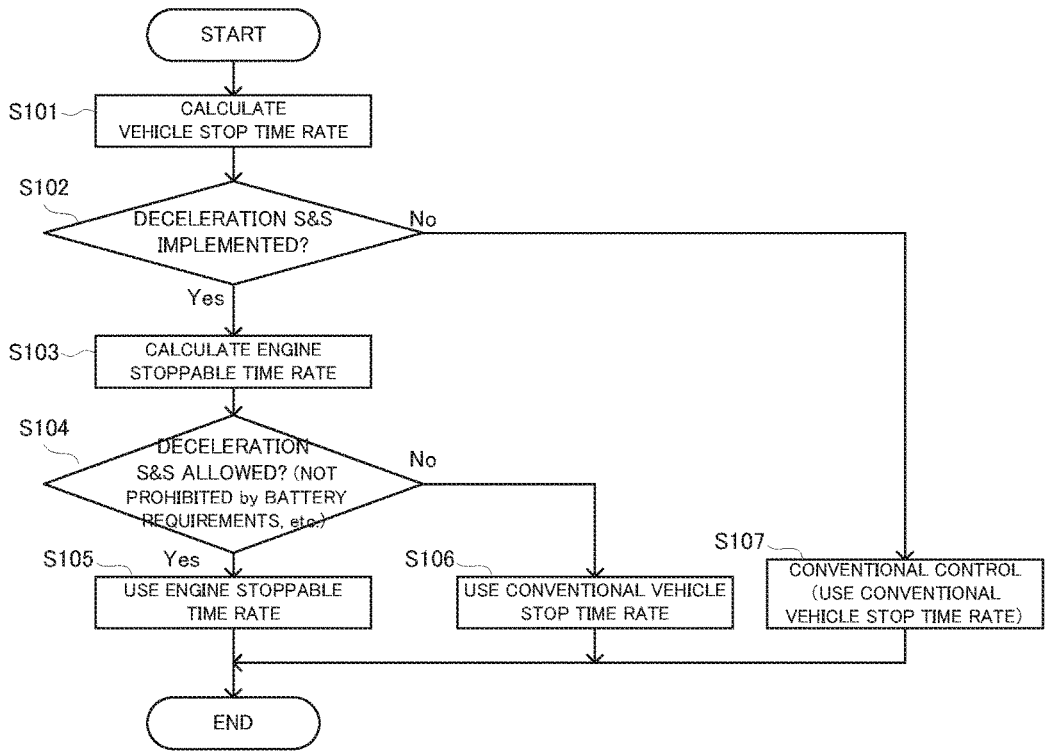
FIG. 4 is a flowchart illustrating a selection routine according to the embodiment.

Here, the travel environment prediction unit 112 uses which one of the vehicles stop time rate and the stoppable time rate is to be used, in accordance with a routine illustrated in a flowchart in FIG. 4.

In FIG. 4, the travel environment prediction unit 112 calculates the vehicle stop time rate (step S101). Then, the travel environment prediction unit 112 determines whether or not the idling stop control during deceleration (or deceleration stop and start) is implemented in the vehicle 200 (step S102). Whether or not the idling stop control during deceleration is implemented may be determined, for example, by detecting whether or not there is a corresponding program.

If it is determined that the idling stop control during deceleration is implemented (the step S102: Yes), the travel environment prediction unit 112 calculates the stoppable time rate (step S103). Then, the travel environment prediction unit 112 determines whether or not the idling stop control during deceleration is allowed (step S104).

Specifically, for example, the travel environment prediction unit 112 determines that the idling stop control during deceleration is allowed, on condition that the lowest voltage in previous cranking for the restart of the engine 10 is less than a predetermined value (e.g. 8 V).

If the automatic transmission 15 is a continuously variable transmission, not only the lowest voltage in cranking but also the shift of the automatic transmission 15, the road gradient, or similar conditions are considered, when it is determined whether or not the idling stop control during deceleration is allowed. Conditions for allowing the idling stop control during deceleration may be appropriately set according to specification of the vehicle to which the present invention is applied.

If it is determined that the idling stop control during deceleration is allowed (the step S104: Yes), the travel environment prediction unit 112 uses the stoppable time rate to obtain the travel environment index (step S105).

On the other hand, if it is determined that the idling stop control during deceleration is not allowed (the step S104: No), the travel environment prediction unit 112 uses the vehicle stop time rate to obtain the travel environment index (step S106).

In the process in the step S102, if it is determined that the idling stop control during deceleration is not implemented (the step S102: No), the travel environment prediction unit 112 calculates the vehicle stop time rate to obtain the travel environment index (step S107).

Back in FIG. 2 again, the own vehicle state prediction unit 114 predicts an own vehicle state, which is a state of the vehicle 200. The "own vehicle state" is a parameter that indicates to what extent the SOC will be consumed by the vehicle 200.

Specifically, the own vehicle state prediction unit 114 calculates an electric power amount consumed by the auxiliary machinery 70, on the basis of the batter current Ab detected by the battery current sensor 88 and an alternator current Aa detected by the alternator current sensor 89, and outputs the electric power amount as an own vehicle state P2.

The SOC distribution requirement level calculation unit 116 calculates a SOC distribution requirement level P3 on the basis of the general travel environment index P1 and the own vehicle state P2. The target SOC calculation unit 118 calculates a target SOC value C1 on the basis of the SOC distribution requirement level P3.

Specifically, the SOC distribution requirement level calculation unit 116 uses a map MP for calculating the SOC distribution requirement level (refer to FIG. 5) and calculates the SOC distribution requirement level on the basis of the general travel environment index P1 and the own vehicle state P2. Here, the "SOC distribution requirement level" is a parameter that specifies a distribution level when a usable SOC range of the battery 40 is distributed for idling stop and for charge control.

Figure 5:
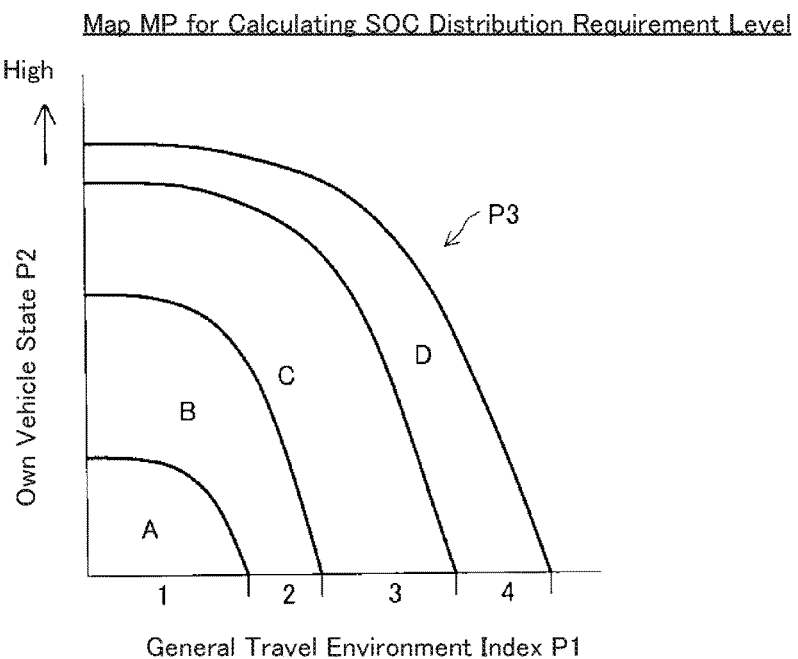
FIG. 5 is an exemplary map for calculating a SOC distribution requirement level.

As illustrated in FIG. 5, the map MP for calculating the SOC distribution requirement level is map data in which the SOC distribution requirement level P3 corresponding to a value on a horizontal axis and a value on vertical axis is mapped, wherein the map MP has the general travel environment index P1 on the horizontal axis and the own vehicle state P2 on the vertical axis.

The map as described above may be configured, for example, by obtaining a relation among the general travel environment index P1, the own vehicle state P2, and the SOC distribution requirement level P3, by experiments or by simulations in advance.

The map MP for calculating the SOC distribution requirement level exemplified in FIG. 5 has four values of A, B, C, and D, which are prepared as the SOC distribution requirement level P3. A, B, C, and D have values that are higher in this order. As the general travel environment index P1 becomes higher and/or as the own vehicle state P2 becomes higher, the SOC distribution requirement level P3 becomes higher.

The target SOC calculation unit 118 uses a table TB for calculating the target SOC value (refer to FIG. 6), calculates the target SOC value C1 on the basis of the SOC distribution requirement level P3, and transmits the calculated target SOC value C1 to the feedback control unit 130 (refer to FIG. 2).

Figure 6:
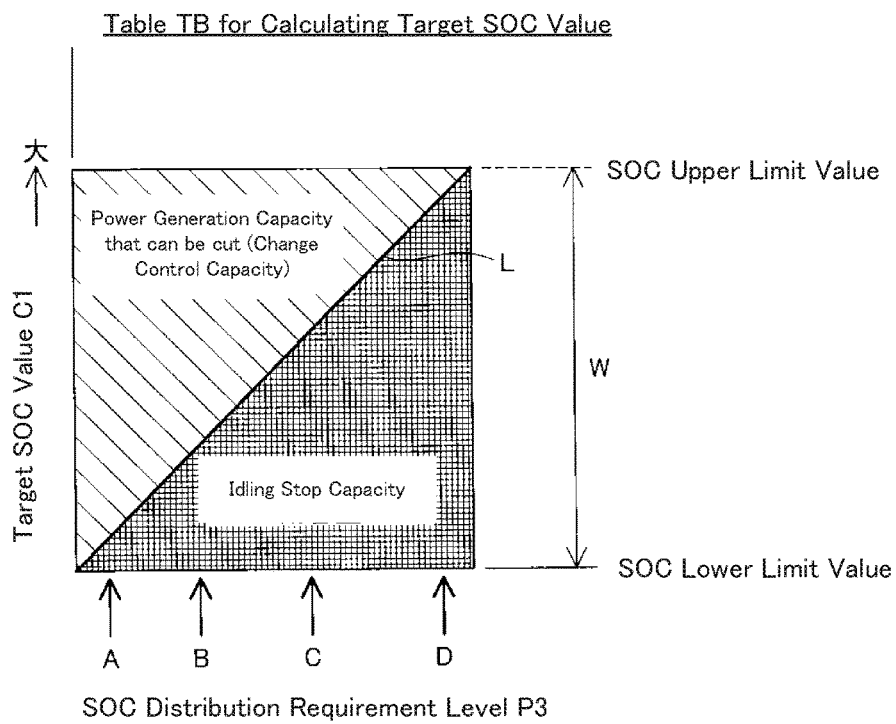
FIG. 6 is an exemplary table for calculating a target SOC value.

As illustrated in FIG. 6, the table TB for calculating the target SOC value has the SOC distribution requirement level P3 on a horizontal axis, and the target SOC value C1 on a vertical axis, and uses a line L to indicate a relation between the SOC distribution requirement level P3 and the target SOC value C1. The table as described above may be configured, for example, by obtaining the relation between the SOC distribution requirement level P3 and the target SOC value C1 by experiments or by simulations in advance.

As illustrated in FIG. 6, the target SOC value C1 indicated by the line L is a value set in a usable SOC range W of the battery 40, and indicates a distribution rate when the usable SOC range W is distributed to a power generation capacity that can be cut and an idling stop capacity. The "power generation capacity that can be cut" is an electric power amount that can be reduced by suppressing power generation in charge control, and is referred to as a "charge control capacity".

As a result of the aforementioned process, the alternator 35 is controlled by the ECU 50 so that the present SOC value C2 is the target SOC value C1. It is thus possible to avoid a remaining capacity of the battery 40 (i.e. the present SOC value C2) falling below the idling stop capacity during driving of the vehicle 200.

Figure 7:
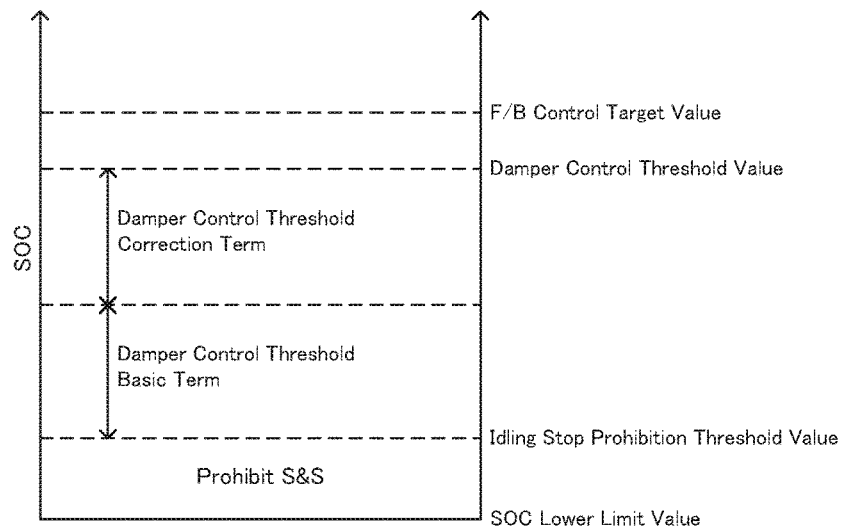
FIG. 7 is a diagram illustrating one example of a SOC control threshold value of a battery according to the embodiment.

The idling stop capacity will be explained with reference to FIG. 7 and FIG. 8.

The ECU 50 according to the embodiment performs not only the feedback control in which the alternator 35 is controlled so that the present SOC value C2 is the target SOC value C1, as described above, but also control according to the SOC of the battery 40.

Specifically, for example, if the SOC of the battery 40 falls below an idling stop prohibition threshold value (refer to FIG. 7), the ECU 50 prohibits the idling stop control and sets power generation instruction voltage associated with the alternator 35 to a fast charge voltage value. As a result, the alternator 35 performs constant voltage power generation for fast charge, and the battery 40 is quickly charged.

Moreover, if the SOC of the battery 40 falls below a damper control threshold value (refer to FIG. 7), the ECU 50 sets an upper limit value of the power generation instruction voltage associated with the alternator 35, for example, to a value that is higher than an upper limit value of the voltage instruction value Sv (refer to FIG. 2) in the feedback control. As a result, a charge amount of the battery 40 per unit time increases, and the SOC of the battery 40 can be recovered relatively early. Such a control process is referred to as "damper control" in the embodiment. The damper control is different from the fast charge in the point that the power generation instruction voltage associated with the alternator 35 changes according to a travel state of the vehicle 200.

The damper control threshold value that determines whether or not to perform the damper control is obtained by adding a damper control threshold basic term and a damper control threshold correction term to the idling stop prohibition threshold value.

The damper control threshold basic term is obtained on the basis of an auxiliary current amount, and a stop time of the engine 10 obtained from the vehicle stop time rate or the stoppable time rate. Specifically, for example, by using a map indicating a relation between the vehicle stop time rate and an estimated maximum vehicle stop time (not illustrated) or a map indicating a relation between the stoppable time rate and an estimated maximum stoppable time (not illustrated), the estimated maximum vehicle stop time or the estimated maximum stoppable time is obtained on the basis of the vehicle stop time rate or the stoppable time rate. A value obtained by converting a product of the obtained estimated maximum vehicle stop time or estimated maximum stoppable time and the auxiliary current amount to a unit of the SOC is obtained as the damper control threshold basic term.

The vehicle stop time rate and the stoppable time rate are obtained on the basis of a past travel state of the vehicle 20 (i.e. the travel history), as described above. Thus, it can be said that the estimated maximum vehicle stop and the estimated maximum stoppable time respectively based on the vehicle stop time rate and the stoppable time rate are predicted values of a next stop and start period. Therefore, it can be said that the product of the estimated maximum vehicle stop or the estimated maximum stoppable time and the auxiliary current amount is an electric power amount that is estimated to be used in a next stop and start period (hereinafter referred to as an "estimated power consumption amount, as occasion demands). In other words, the damper control threshold basic term is a value obtained by converting the estimated power consumption amount to the unit of the SOC.

The damper control threshold correction term is a value obtained by converting a product of a difference between a present charge/discharge current integrated value and a past charge/discharge current integrated value (e.g. 5 min ago) and a certain multiplication/division rate, which is an arbitrary constant, to the unit of the SOC. Since various known aspects can be applied to a method of obtaining the charge/discharge current integrated value, an explanation of details of the method will be omitted.

Figure 8:
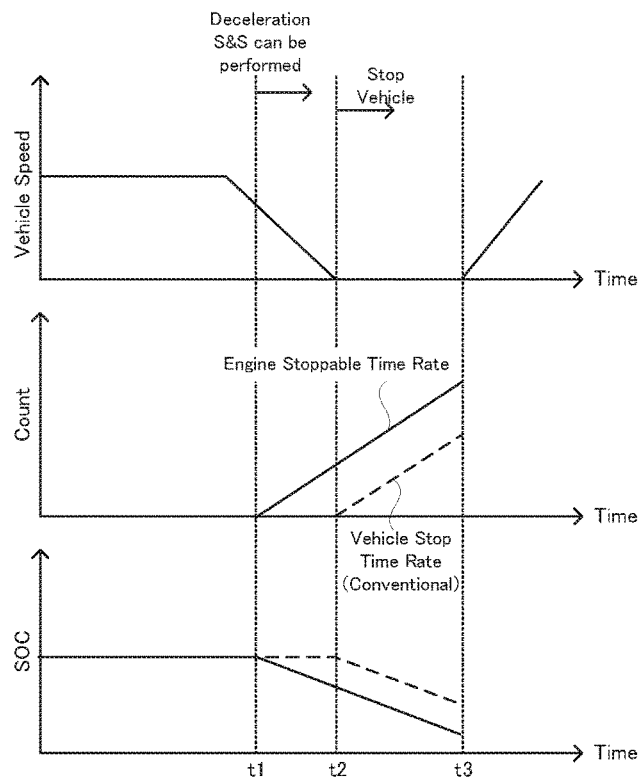
FIG. 8 is an exemplary time chart regarding a vehicle speed of a vehicle, a count, and a SOC of the battery according to the embodiment.

Now, as illustrated in FIG. 8, if the idling stop control during deceleration is allowed, the engine 10 is stopped from a time point t1 to a time point t3. Thus, in comparison with a case where the engine 10 is stopped by the idling stop control only when the vehicle 200 stops, the stop time of the engine 10 is increased, and the estimated power consumption amount is also increased.

Therefore, the damper control threshold value when the idling stop control during deceleration is allowed (i.e. when the stoppable time rate is used) is higher than the damper control threshold value when the idling stop control during deceleration is not allowed (i.e. when the vehicle stop time rate is used). A "count" (on a vertical axis) in the middle part of FIG. 8 means the stoppable time rate or the vehicle stop time rate.

A feedback (F/B) control target value is a value obtained by adding a predetermined margin to the damper control threshold value, and is a value corresponding to the target SOC value C1 in FIG. 2. In other words, from a SOC lower limit value in FIG. 7 to the feedback control target value corresponds to the idling stop capacity in FIG. 6.

Due to the aforementioned feedback control, the SOC of the battery 40 falling below the idling stop capacity is avoided. It is thus possible to avoid the SOC of the battery 40 falling below the estimated power consumption amount. Moreover, if the damper control is performed, the SOC of the battery 40 is relatively easily recovered to be greater than or equal to the damper control threshold value. Thus, even in this case, it is possible to avoid the SOC of the battery 40 falling below the estimated power consumption amount.

The "alternator 35" according to the embodiment is one example of the "generator" according to the present invention. The "travel environment prediction unit 112" according to the embodiment is one example of the "first calculating device" and the "second calculating device" according to the present invention. The "ECU 50" according to the embodiment is one example of the "estimating device", the "controlling device", and the power supply control apparatus" according to the present invention.

The invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A power supply control apparatus configured to perform idling stop control of an engine when a vehicle stops and in a partial period when the vehicle decelerates, wherein the vehicle includes the engine, a generator, and a battery, said power supply control apparatus comprising:

a first calculating device configured to calculate a vehicle stop time rate, which is a rate of a time in which the vehicle is stopped, on the basis of a travel history of the vehicle;

a second calculating device configured to calculate a stoppable time rate, which is a rate of a sum of a time in which the idling stop control is allowed when the vehicle decelerates and a time in which the vehicle is stopped, on the basis of the travel history, an estimating device configured to estimate an electric power amount associated with the idling stop control, on the basis of the calculated stoppable time rate if the idling stop control is allowed when the vehicle decelerates, and to estimate the electric power amount, on the basis of the calculated vehicle stop time rate if the idling stop control is not allowed when the vehicle decelerates; and a controlling device configured to control charge of the battery performed by power generation of the generator so as to avoid a remaining electric power amount of the battery falling below the estimated electric power amount.

* * * * *